United States Patent [19]

Currie

[11] 4,014,032

[45] Mar. 22, 1977

[54] PHOTOGRAPHIC APPARATUS

[75] Inventor: John Currie, Walton-on-Thames, England

[73] Assignee: Photo-Me Limited, Walton-on-Thames, England

[22] Filed: Sept. 8, 1975

[21] Appl. No.: 611,528

[30] Foreign Application Priority Data

Sept. 10, 1974 United Kingdom ............ 39411/74

[52] U.S. Cl. .............................. 354/93; 354/328; 259/113

[51] Int. Cl.² .................. G03B 17/50; G03D 3/04; B01F 13/00

[58] Field of Search .... 354/93, 316, 322, 328–330; 259/19, 27, 61, 71, 99, 112, 113

[56] References Cited

UNITED STATES PATENTS

| 2,183,742 | 12/1939 | Herschberg | 354/93 |
| 2,380,378 | 7/1945 | Allen | 354/93 X |
| 2,916,976 | 12/1959 | Applegate et al. | 354/93 |
| 3,722,384 | 3/1973 | Chiesa | 354/93 |
| 3,832,730 | 8/1974 | Geyken et al. | 354/93 X |
| 3,861,653 | 1/1975 | Becheiraz | 259/19 |

*Primary Examiner*—George H. Miller, Jr.
*Attorney, Agent, or Firm*—William R. Liberman

[57] ABSTRACT

A photographic apparatus has a camera beneath which is arranged a circular array of open topped tanks for processing liquid. A film carrier is arranged to receive exposed film from the camera and can move up and down as well as rotate step by step in order to dip film received from the camera and carried by the carrier into each tank of the array in turn. Each tank has an agitator therein. Each agitator has an operating stem which can move up and down in the tank. The stem has a plurality of agitator blades which are caused to move by the upward and downward movement of the operating stem so as to agitate the liquid in the tank.

2 Claims, 2 Drawing Figures

PHOTOGRAPHIC APPARATUS

BACKGROUND OF THE INVENTION

A known photographic apparatus comprises a studio booth divided by an upright partition into a posing compartment in which a person to be photographed can pose and a cupboardlike compartment for the photographic equipment of the apparatus. This cupboard is itself divided by a horizontal shelf into an upper section containing a camera arranged to photograph the subject in the posing compartment and a lower processing section which receives exposed film from the camera, processes the film and ejects the processed film through an outlet slot. The film may be a transparency but is preferably a paper or paper-like material on which a positive image is produced. A start switch is operated from the posing compartment, conveniently by a coin operated mechanism. The insertion of a coin in the coin operated mechanism initiates operation of an electrical mechanism which charges strobe lamps, illuminates pose instructions in the posing compartment, starts the operation of the camera and the film processing equipment. Such photographic apparatus is generally known and need not be described herein in detail. An object of the present invention is to provide an improved such apparatus.

BRIEF SUMMARY OF THE INVENTION

A photographic apparatus comprising a camera, a circular array of open topped processing tanks adapted to contain processing liquids and arranged beneath the camera, a film carrier disposed beneath the camera and above the array of processing tanks, the said carrier being arranged to receive exposed film from the camera, means for moving the carrier up and down and for rotating it step by step thereby to dip the film carried by the carrier into each tank of the array in turn, wherein each tank is provided with an agitator comprising an operating stem arranged to be moved downwards in the tak when the carrier moves downwards, means for moving the operating stem upwards when the carrier moves upwards, and a plurality of agitator blades which are movable by upward and downward movement of the operating stem thereby to agitate liquid in the tank.

DESCRIPTION OF PREFERRED EMBODIMENTS

Figure 1:
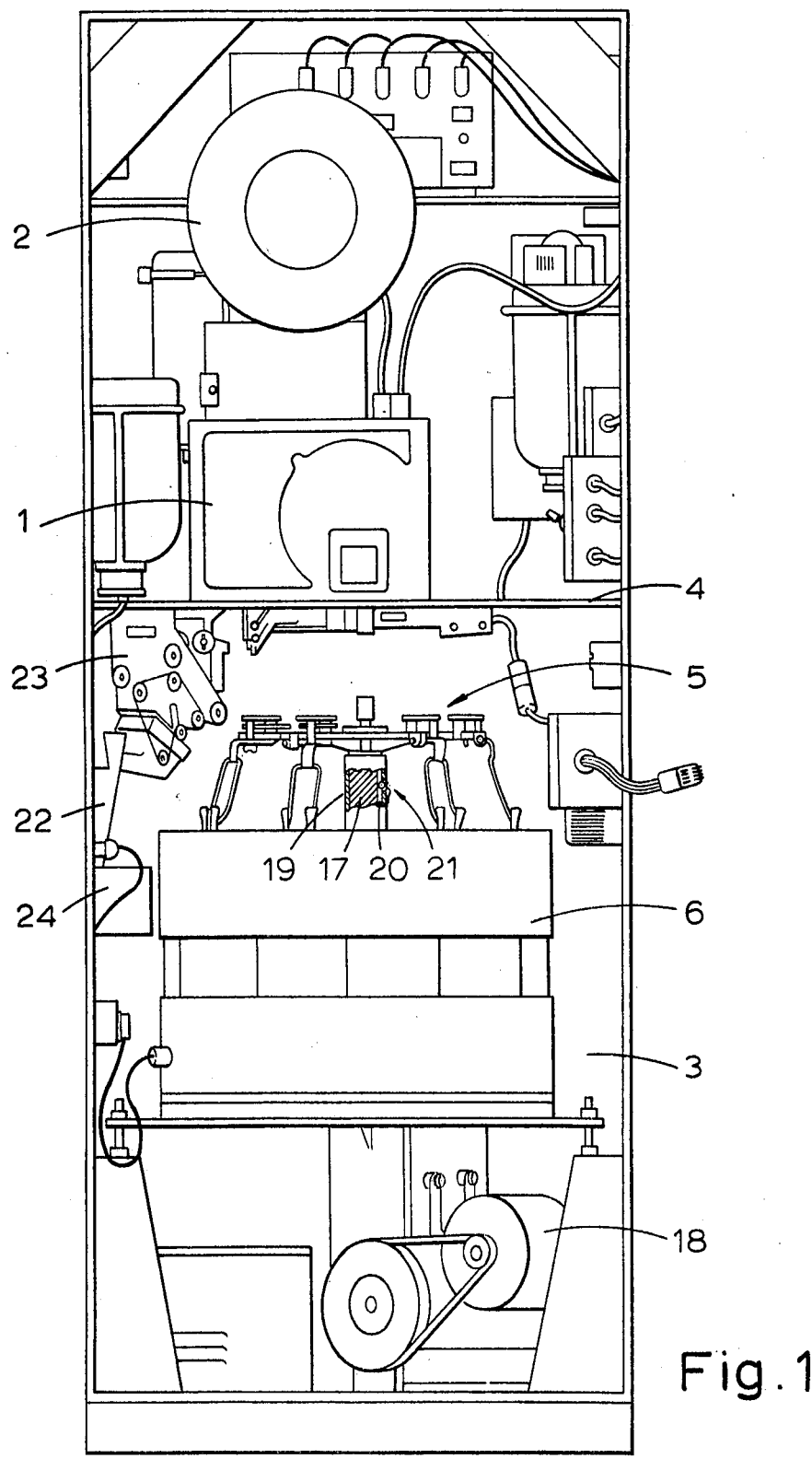
FIG. 1 is a general arrangement view of a photographic apparatus.

In the illustrated embodiment of the invention, film is supplied to the camera 1 as a continuous strip from a reel contained in a cassette 2. When a photographic operation is completed, the exposed film is fed down from a camera 1 into a lower processing compartment 3 equipment below a shelf 4. The feed down mechanism is in general well known and is not therefore illustrated in the drawings. The film is pulled down by passage through a nip between these two rollers. One of the rollers has a metal surface contacting one side of the film. The feed down mechanism of the present invention differs from that of known mechanisms in that the other roller has a rubber surface contacting the other side of the film. These rollers are mounted on parallel shafts. One of these shafts is rotated by an electric motor acting on the shaft through a Geneva mechanism. The other shaft has a toothed wheel which meshes with a toothed wheel on the first shaft so that rotation of the first shaft causes rotation of the second shaft; thus both rollers are driven.

The exposed film is fed through a cutting mechanism which cuts it up into pieces of a length corresponding to the number of photographs taken by the camera in one sequence initiated by the insertion of a coin into a coin operated mechanism. Each severed piece of exposed film is fed into a carrier 5 arranged beneath the shelf 4 and above a circular array 6 of open topped processing tanks containing processing liquids. The carrier 5 is arranged to move up and down as well as to rotate step by step. The processing sequence is begun after the carrier 5 receives a section of exposed film by movement of the carrier downwards to dip the exposed film into the first tank of the array 6. After a predetermined period of dwell, the carrier 5 rises to remove the film from the tank and then rotates to position the film above the next tank after which it again descends to put the film into that next tank. This sequence is repeated until the film has been dipped in and removed from each of the tanks in turn. Such an arrangement of carrier 5 and tanks 6 is generally known and need not be described further in detail.

Figure 2:
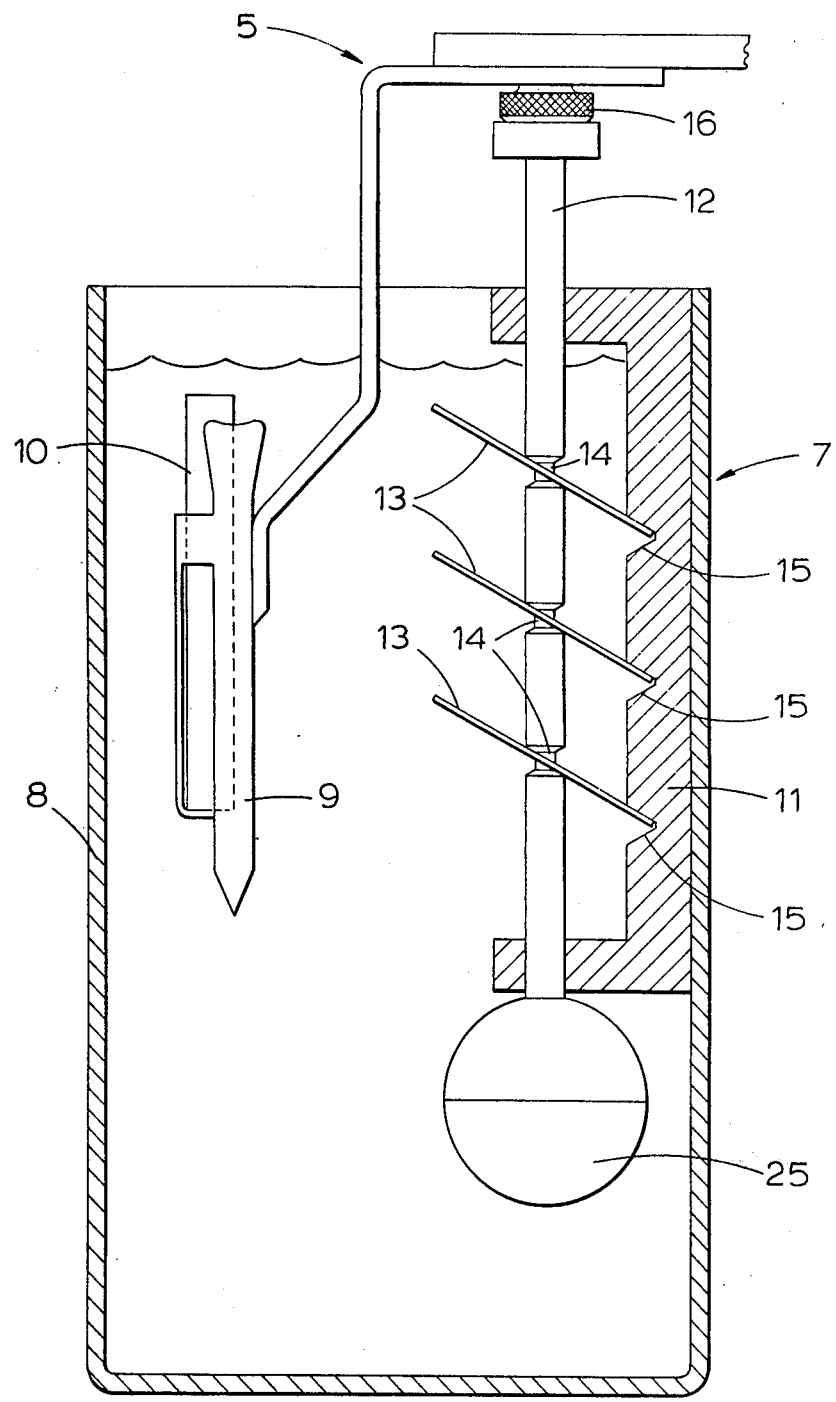
FIG. 2 is a section view of part of an agitator device of the apparatus.

Liquid tends to adhere to the surface of film in the processing tanks. The present invention provides a liquid agitator in each tank. FIG. 2 illustrates an agitator 7 in one of these tanks 8, the agitator arrangement being the same in all the other tanks on the array 6. The carrier 5 comprises an individual carrier 9 for a cut section of film 10. Each of the agitators 7 comprises an agitator body 11 in which an upright stem 12 can move up and down. A plurality of agitator blades 13 are hingedly connected to constricted portions 14 of the stem 12 and extend at an angle to the horizontal over a part of the cross-sectional area of the tank 8. An end of each blade 13 is freely located in a U-sectioned slot 15 in the agitator body 11. The top of the agitator stem 12 is positioned to be engaged by a knurled nut 16 on the carrier 5 as it descends to lower a film 10 into the processing tank 8. This causes the blades 13 to swing downwards about their hinged connection with the upright stem 12 since the free ends of the blades are located in the slots 15, floatation ball 25 is fixed to the bottom of the stem 12 to return the stem and blades 13 to the normal position when the carrier rises. This arrangement keeps the liquid in the tank 8 agitated sufficiently to prevent it adhering to the surface of the film 10. The agitator 7, must be made of a material which is inert to the processing liquids.

The carrier 5 is rotated through a carrier drive shaft 17 from an electric motor 18. The shaft 17 is rotatable in a sleeve 19 and has a plurality of recesses 20 (only one of which is shown). A ball catch member 21 or members in the sleeve 19 is or are engageable in these recesses 20 at the completion of each step in the sequence of rotation of the carrier 5. This arrangement eliminates any back-lash in the carrier drive shaft.

The processing film is, after being removed from the last tank, ejected through a discharge chute 22 by an ejection mechanism 23 of known construction. An electric hot air blower 24 is arranged in the lower compartment 3 to direct hot air into the chute 22 and onto the exposed film being ejected through the chute thereby to dry the exposed film.

What is claimed is:

1. A photographic apparatus comprising a camera, a circular array of open topped processing tanks adapted to contain processing liquids and arranged beneath the camera, a film carrier disposed beneath the camera and above the array of processing tanks, the said carrier being arranged to receive exposed film from the camera, means for moving the carrier up and down and for rotating it step by step thereby to dip the film carried by the carrier into each tank of the array in turn, an agitator in each tank, each said agitator comprising a vertically disposed operating stem spaced from a tank side, said stem arranged to be moved downwards in the tank when the carrier moves downwards, means for moving the operating stem upwards when the carrier moves upwards, and a plurality of agitator blades extending transversely of the stem and mounted thereon for limited pivotal movement with respect thereto, with an end of each blade remote from the stem, movably socketed in a transverse groove in said tank side, which blades are movable about their respective connections to the stem and tank side by upward and downward movement of the operating stem thereby to agitate liquid in the tank.

2. An apparatus as claimed in claim 1, in which said stem is positioned to be engaged and depressed by the carrier as it moves downwards and has a flotation ball at its lower end, said stem being moved upwards when the carrier moves upwards owing to the flotation of the ball in liquid in the tank.

* * * * *